(12) United States Patent
Krebs

(10) Patent No.: US 11,512,779 B2
(45) Date of Patent: Nov. 29, 2022

(54) SEAL ASSEMBLY

(71) Applicant: Aktiebolaget SKF, Gothenburg (SE)

(72) Inventor: Matthias Krebs, Heidelberg (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/933,585

(22) Filed: Mar. 23, 2018

(65) Prior Publication Data

US 2018/0306326 A1  Oct. 25, 2018

(30) Foreign Application Priority Data

Apr. 21, 2017  (DE) ..................... 10 2017 206 770.5

(51) Int. Cl.

| *F16J 15/3284* | (2016.01) |
| *F16J 15/324* | (2016.01) |
| *F16J 15/3244* | (2016.01) |
| *F16J 15/24* | (2006.01) |
| *F16J 15/328* | (2016.01) |

(52) U.S. Cl.
CPC .......... *F16J 15/3284* (2013.01); *F16J 15/24* (2013.01); *F16J 15/324* (2013.01); *F16J 15/3244* (2013.01); *F05C 2225/04* (2013.01); *F16J 15/328* (2013.01)

(58) Field of Classification Search
CPC .... F16J 15/324; F16J 15/3244; F16J 15/3268; F16J 15/164; F16J 15/3284; F16J 15/328
See application file for complete search history.

(56) References Cited

U.S. PATENT DOCUMENTS

| 5,018,753 A | | 5/1991 | Porel | |
| 5,139,275 A | * | 8/1992 | Ehrmann | ............... F16J 15/324 |
| | | | | 277/559 |
| 5,921,555 A | * | 7/1999 | Johnston | ............. F16J 15/3228 |
| | | | | 277/549 |
| 6,056,292 A | * | 5/2000 | Gerigk | ................... F16J 15/324 |
| | | | | 277/549 |

(Continued)

FOREIGN PATENT DOCUMENTS

| CN | 103527790 A | 1/2014 |
| CN | 105402411 A | 3/2016 |

(Continued)

OTHER PUBLICATIONS

Office Action and Search Report from the Chinese Patent Office dispatched Apr. 2, 2021 in related application No. 201810312324.7, and translation thereof.

*Primary Examiner* — Christine M Mills
*Assistant Examiner* — L. Susmitha Koneru
(74) *Attorney, Agent, or Firm* — J-Tek Law PLLC; Scott T. Wakeman; Mark A. Ussai

(57) ABSTRACT

A seal assembly configured to seal a first machine part relative to a second machine part includes a sliding ring provided on the first machine part, the sliding ring having a sealing surface configured to slidingly abut a counter surface of the second machine part, and includes a clamping ring configured to exert a force on the sliding ring in a direction of the counter surface. The sliding ring includes a plurality of circumferentially spaced recesses in the seal surface that extend axially and radially into the sliding ring.

9 Claims, 5 Drawing Sheets

(56) References Cited

U.S. PATENT DOCUMENTS

| | | | | |
|---|---|---|---|---|
| 8,313,104 B2* | 11/2012 | Maeda | ................ | F16J 15/3208 |
| | | | | 277/459 |
| 9,482,344 B2* | 11/2016 | Sattler | ................ | F16J 15/3244 |
| 2002/0084593 A1 | 7/2002 | Baehl et al. | | |
| 2004/0251636 A1 | 12/2004 | Jordan | | |
| 2005/0029483 A1* | 2/2005 | Bancroft | ................ | F16J 15/164 |
| | | | | 251/306 |
| 2013/0001884 A1 | 1/2013 | Dobrolyubov et al. | | |

FOREIGN PATENT DOCUMENTS

| | | | | |
|---|---|---|---|---|
| DE | 29822515 U1 * | 7/1999 | ........... | F16J 15/3208 |
| DE | 69326961 T2 | 6/2000 | | |
| DE | 10145914 A1 | 5/2003 | | |
| WO | 9503504 A1 | 2/1995 | | |

* cited by examiner

SEAL ASSEMBLY

CROSS-REFERENCE

This application claims priority to German patent application no. 10 2017 206 770.5 filed on Apr. 21, 2017, the contents of which are fully incorporated herein by reference.

TECHNOLOGICAL FIELD

The disclosure relates to a seal assembly for sealing two machine parts movable against each other.

BACKGROUND

Rotary distributors are used, for example, in construction machines in order to distribute media, such as, for example, hydraulic fluids and/or lubricant in various channels, so that they can be guided to corresponding points of the machine. Here it is often necessary that the media are distributed from a central point, for example, a reservoir, via a central distributor device under high pressure, which in individual cases is up to hundreds of bar.

Known embodiments of rotary distributors include a shaft that is supported in a housing, which is traversed by a plurality of channels so that the medium to be distributed can be pumped into the channels under high pressure. Here the shaft performs a rotating or pivoting movement by which one or more of the channels can receive and transport medium. In such applications it is essential to seal the individual channels with respect to each other as well as with respect to the environment on the rotating or pivoting shaft, both in order to prevent the penetrating of medium from the environment into the interior of the machine and to prevent a contamination of the environment by the medium to be guided by the rotary joint. Due to the combination of high pressure differences (hundreds of bar) with high sliding speeds between 2 respectively adjacent channels, or the end channel and the environment and the interior, this application places high demands on the seal. In all possible operating states a secure sealing of the rotating shaft must be ensured and a leakage largely prevented.

Seal assemblies are already known from the prior art that partially meet these requirements.

Thus for example a seal assembly is known from DE 10145914 A1 (family member of US 2004/251636), wherein a seal ring including a seal surface abuts on a shaft. The seal ring is pressed onto the shaft by a clamping ring. Both rings are supported in a groove in the housing. Under high pressures the seal ring is deformed such that an additional sealing edge abuts on the shaft on the low-pressure side.

SUMMARY

It is an aspect of the present disclosure to provide an improved seal.

This is achieved by preferred exemplary embodiments of the disclosure. A seal assembly including the following features is provided for sealing two machine elements movable against each other.

A sliding ring including a seal surface that is provided at least in a non-moving machine element for sealing abutment on a counter-surface of one of the machine elements, A preload ring, by which a force acting toward the counter-surface is exertable on the sliding ring, The sliding ring includes a plurality of circumferentially spaced recesses in the seal surface that extend axially and radially into the sliding ring.

The machine parts moving against each other can be, for example, a rotating shaft and a housing surrounding the shaft, as can be found in numerous applications. A gap is typically located between housing and shaft so that the shaft can perform a rotating- or pivoting-movement. In this example the preload ring and the sliding ring can be disposed in a groove of the housing, wherein the seal surface of the sliding ring is oriented toward the shaft. An interior of the housing, which contains a medium, for example, a lubricant or a hydraulic fluid, is sealed from the environment by the seal assembly so that the medium does not escape. Simultaneously or alternatively foreign particles and liquids can be kept away from the environment of the interior and the medium.

Due to the preload ring the sliding ring is subjected to a force by which the seal surface is pressed toward the counter-surface. With a stationary shaft the seal surface is pressed against the counter-surface so that a sealing effect is achieved. Conversely, with movement of the shaft a direct contact of the seal surface with the counter-surface of the shaft would result in high wear. Therefore in this dynamic case a thin film is generated between seal surface and counter-surface. For this purpose a defined amount of medium is pumped from the housing under the sliding ring. It is essential here to introduce an amount of medium adjusted precisely to the application and the pressure conditions prevailing between interior and environment so that a leakage is prevented to the greatest degree possible.

Due to adhesive forces and the viscosity of the medium, with movement of the shaft this medium is brought along therewith and thus moved along parallel on the axial end of the sliding ring facing the interior. Here in typical applications a pressure prevails in the interior of, for example, 400 bar, which creates a high demand on the seal assembly. In addition, medium is located in the recesses, wherein due to their axial and radial extension in the sliding ring, it is not only guided therein parallel to the side of the sliding ring, but flows in with a perpendicular movement component in a section onto the sealing edge formed by the recesses. In this section an active pumping effect thereby arises of the medium under the seal surface that lies rearward in the movement direction. The medium spreads from this edge under the seal surface so that a lubricating film forms and the seal is protected from wear.

It is also advantageous when the preload ring and the sliding ring are disposed in a groove of the housing such that the pressure of the interior can also act on the preload ring. The preload ring is configured such that an increase of the pressure exerted on the preload ring results in an increase of the force exerted on the sliding ring. The sliding ring is subsequently pressed more strongly onto the counter-surface and thus the seal effect increases.

A seal assembly wherein the seal surface acts radially outwardly against a moving machine part functions analogously. The disclosure device can thus be used in inwardly and outwardly sealing applications.

The recesses are preferably merge into the seal surface axially and in the circumferential direction. An improved and defined pumping effect of the medium thereby arises.

In one advantageous embodiment of the disclosure, inner surfaces of the recesses form an angle in the circumferential direction of 10° to 35° with the seal surface. Of the two angles that form a tangent to the inner surface, which tangent lies in the point of contact of the inner surface, with a corresponding tangent to the seal surface (both angles together necessarily produce 180° as adjacent angles), the angle here and in the following shall be that angle that does not lie geometrically inside the sliding ring. In the example of a to-be-sealed shaft this can also be referred to as the angle that the tangent to the inner surface forms with the tangent to the shaft surface or the counter-surface. In the present case the angle falls within the recess, which consequently tapers toward the seal surface. Due to the relatively flat angular range an improved pumping effect results. The angle is to be adapted according to the application.

In one advantageous embodiment of the disclosure, the inner surfaces of the recesses form an angle in the axial direction of 35° to 55° with the seal surface. In the axial direction a highest possible sealing effect is to be achieved so that a steeper angle in comparison to the circumferential direction is advantageous here. A tapering of the recess in this direction is also present here, which, however, is less strongly pronounced than in the circumferential direction.

In one advantageous design of the disclosure, axial outer surfaces of the sliding ring, which axial outer surfaces lie between the recesses, are configured such that they form an angle between 70° and 90° with the seal surface. Here the seal effect is to be selected maximally in order to largely prevent leakage. A sealing edge having an angle of 90° would be particularly preferred, however, for manufacturing technology reasons is rarely to be used. However, a sufficiently high sealing effect is already ensured with an angle of 80°. Embodiments are also possible wherein the angle falls between 70° and 110°.

In one advantageous embodiment of the disclosure the recesses are configured arcuate in the axial direction. A more uniform and more defined lubricant ingress under the sliding ring along the arcuate edge of the recess thus results. Such recesses are also manufacturable with little effort.

In one advantageous design of the disclosure the recesses are configured arcuate in the radial direction. A more uniform pressure buildup thus arises, which positively influences the pumping effect.

Overall the recesses are configured bowl-shaped, for example, in the shape of a part of a cylindrical outer surface, as a quarter-sphere or as a quarter-ellipsoid.

In one advantageous design of the disclosure, recesses are formed on both axial sides of the sliding ring. In this respect the seal assembly is double-acting and can accordingly seal in both directions.

In one advantageous design of the disclosure the outer surfaces of the sliding ring and the inner surfaces of the recess form, with the seal surface, a sealing edge extending essentially in the circumferential direction, which sealing edge is formed similar to a wave. By this it is to be understood here that due to the arcuate recesses, the basic circular structure of the seal edge contains wave-like sections that are extend axially from the circle.

In one advantageous embodiment of the disclosure the opposing recesses are disposed offset with respect to one another in the circumferential direction. A sufficiently wide seal surface is thereby always available between the recesses.

In one advantageous design of the disclosure the sliding ring lies radially inside the preload ring and the preload ring is exerts a radially inwardly acting force on the sliding ring. This is advantageous for inwardly sealing applications.

Further advantages and designs of the disclosure are explained in the following exemplary embodiment in conjunction with the drawings.

DETAILED DESCRIPTION

Figure 1:
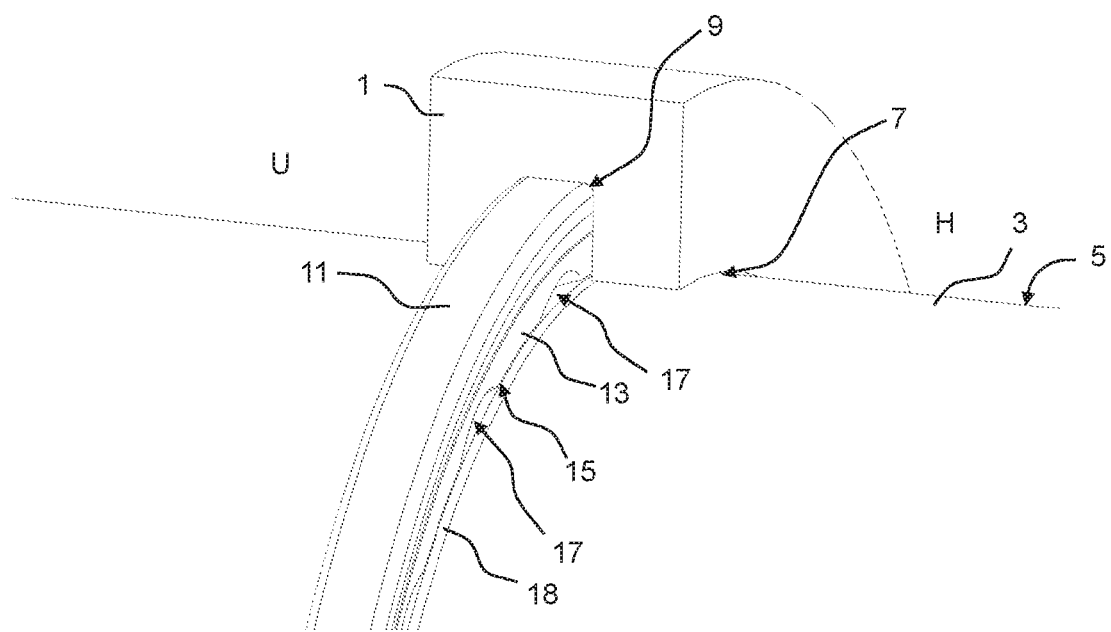
FIG. 1 shows a seal assembly according to one exemplary embodiment of the disclosure.

A preferred embodiment of the disclosure is schematically depicted in FIG. 1. A shaft 3 is rotatably disposed in a housing 1 only partially depicted here. There is a gap 7 between the housing 1 and an outer surface 5 of the shaft 3. The shaft 3 is dimensioned accordingly with respect to its outer diameter such that it is positionable in a contact-free manner within the opening in housing 1. In the housing 1 a groove 9 is formed in which a seal assembly according to an embodiment of the disclosure is disposable. The seal assembly comprises a clamping ring 11 and a seal ring 13 embodied as a sliding ring. The clamping ring 11 is, for example, manufactured from a rubber elastomer. The appropriate material is specifically chosen according to the application parameters with the appropriate temperature- or chemical-resistance. The clamping ring 11 is dimensioned such that it sits fixedly in the groove 9. It sealingly abuts on outer surfaces of the groove 9. The seal ring 13 is manufactured, for example, from polyurethane or a carbon or glass-fiber matrix filled with PTFE. It includes a seal surface 15 in contact with the outer surface 5, which abuts on the outer surface 5 in a contacting manner during stoppage of the shaft 3.

The outer diameter of the seal ring 13 is matched to the inner diameter of the clamping ring 11 such that a radially inwardly acting force is exerted on the seal ring 13 by the clamping ring 11, within which the seal ring 13 is disposed. The seal ring 13 is thus pressed by the clamping ring 11 with its seal surface 15 onto the outer surface 5 of the shaft 3. A high sealing effect is thus achieved with the stationary shaft 3. A high-pressure region H, filled with a medium, for example a hydraulic fluid, is sealed off from an environment U by the seal assembly. In FIG. 1 a lubricating film 18 is schematically indicated, which has formed due to rotation of the shaft 3 between the seal ring 13 and the shaft 3. It is comprised of the medium with which the high-pressure region H is filled. In typical applications the lubricating film 18 has a thickness 0.05 to 0.20 mm and is not depicted to scale in FIG. 1, but rather significantly too thick.

To develop the lubricating film 18, cavities 17 are formed in the seal ring 13 along the circumference, and the functions of the cavities 17 are explained in the following Figures.

Figure 2:
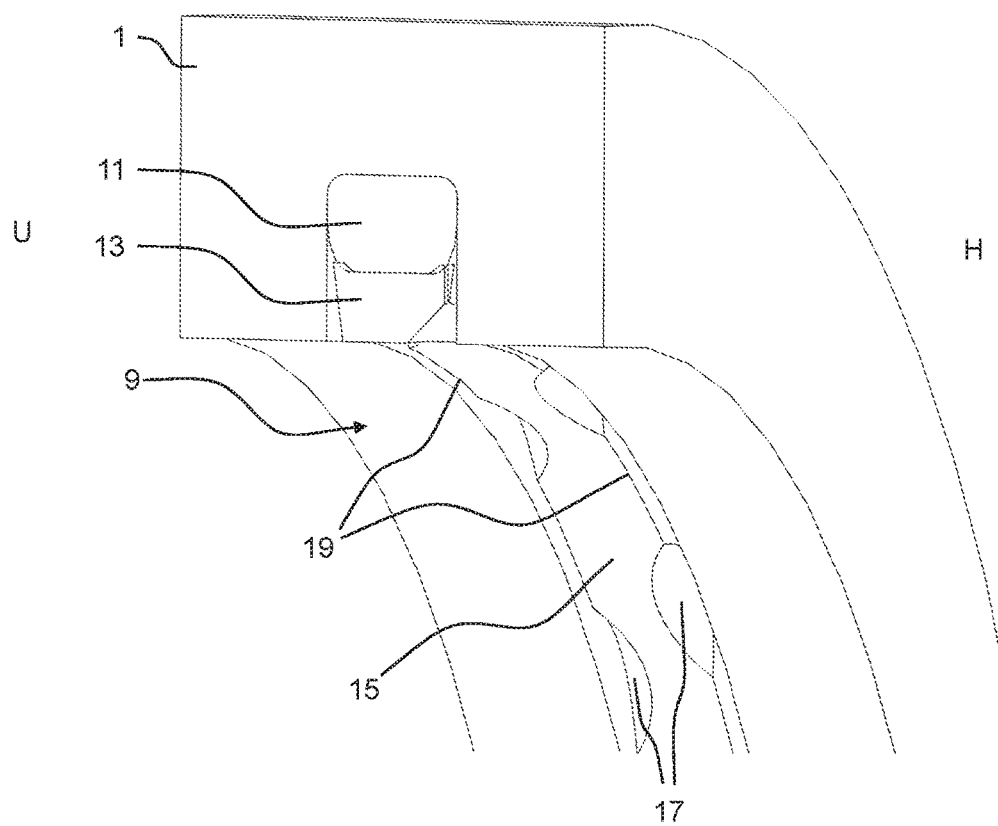
FIG. 2 shows a detail view of the seal assembly in the installed state.

In FIG. 2 the seal assembly is depicted again without the shaft 3. The cavities 17 are formed on both sides on the axial ends of the seal ring 13 and extend both radially and axially from sealing edges 19 of the seal 13 into the seal ring 13 in a bowl-shaped manner. The sealing edge 19, circular in its basic shape, includes arcuate sections in the axial direction. The sealing edge 19 thus has a wave-like course. The respective opposing cavities 19 are slightly offset along the circumference so that there is still a seal surface 15 between them having sufficient width such that at high pressure an extrusion of the seal ring 15 into the gap 7 is minimized as much as possible.

To optimize the sealing function, the medium exerts increased pressure axially on the seal ring when pressure builds in the region H. In addition the medium penetrates into the groove 9 or also exerts the pressure inside the groove 9 on the clamping ring 11. The clamping ring 11 is thereby deformed and for its part exerts an increased pressure on the seal ring 13. The seal ring 13 is consequently pressed more strongly onto the shaft 3 so that its sealing effect is strengthened. In addition, the clamping ring 11 seals the internal surfaces of the groove 9 so that no medium can escape there either.

Figure 3:
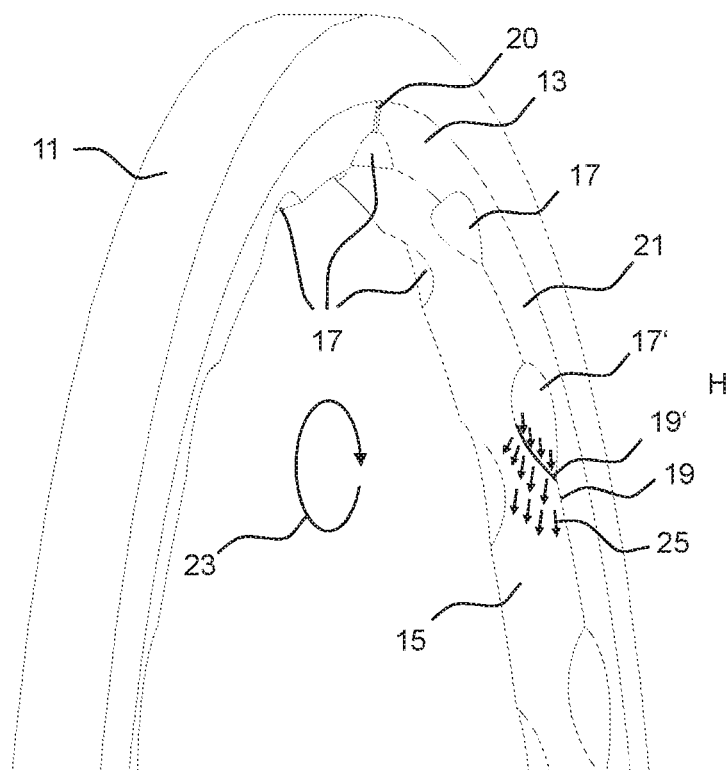
FIG. 3 shows a detail view of the seal assembly.

A further view of the seal assembly is shown in FIG. 3. At at least one point along its circumference the seal ring 13 includes a groove 20, which connects radially to the outside of one of the cavities 17 and extends toward the clamping ring 11. In the comparatively narrow groove 9 it can occur that the seal ring 13 adheres by its side surface 21 to the wall of the groove 9, and thus cannot exert the increased pressure on the clamping ring 11. However, the groove 20 ensures that even with such adhering of the seal ring 13, the pressure can act on the clamping ring 11 via the groove 20.

During a rotating- or pivoting-movement of the shaft 3 it is necessary to lubricate the seal surface 15. The development of the lubricating film is illustrated based on one of the cavities 17'. With rotation of the shaft 3, in the chosen example in the direction of the arrow 23, the medium located in the region H in the vicinity of the outer surface 5 of the shaft 3 is carried along with the shaft by adhesive forces and viscosity; forces acting in the direction of the arrow 23 are thus exerted on the medium. Movement of the medium in the same direction results. In the cavity 17', as well as in all other cavities 17 facing the region H, the moving medium arises on the sealing edge 19 in the region 19' depicted below and highlighted by a thicker line. In this region the force has a component perpendicular to the sealing edge 19, and therefore in combination with the tapering cavity 17' effects a penetrating of the medium under the seal surface 15, which is represented by a plurality of arrows 25.

Figure 4:
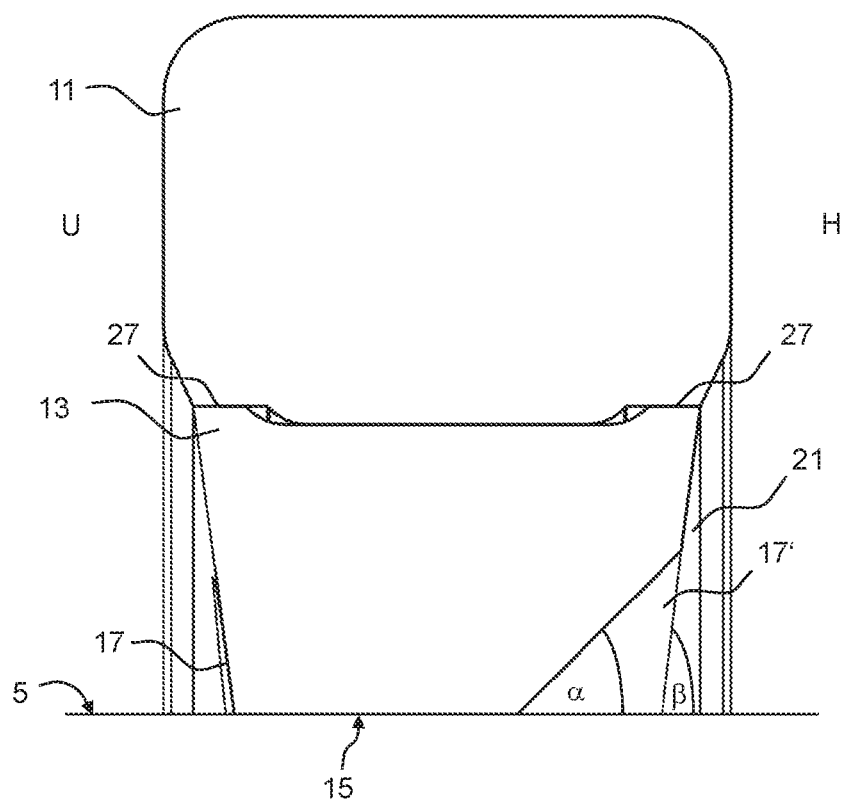
FIG. 4 shows a sectional depiction of the seal assembly.

In FIG. 4 the seal assembly is schematically depicted in a sectional view. The clamping ring 11 lies radially outside the seal ring 13 and presses its seal surface 15 onto the outer surface 5 of the shaft 3. The clamping ring 11 is slightly tapered radially inward and lies on an outer surface of the seal ring 13 in a radial recess that is formed by two annular elevations 27. Thus the clamping ring 11 is axially fixed on the seal ring 13.

The axial side surfaces 21 of the seal ring 13 form an angle β with the outer surface 5 as close as possible to 90° in order to achieve a high-as-possible sealing effect. Realistic values fall between 75° and 90°; values around 80° already generate a good sealing effect. With non-rotating shaft 3 a maximum tightness of the seal assembly is thus ensured. Even with rotating shaft 3 a high tightness against the high pressure in the medium is ensured.

The section of FIG. 4 is taken such that it falls exactly in the center of the cavity 17'. In its center, i.e., in the sectional plane of the illustration, the inner surface 31 of the cavity 17' forms an angle α of 30° to 55° with the seal surface 15 or the outer surface 5. They are preferably 45°. A sufficient sealing effect in the axial direction is thus achieved.

Figure 5:
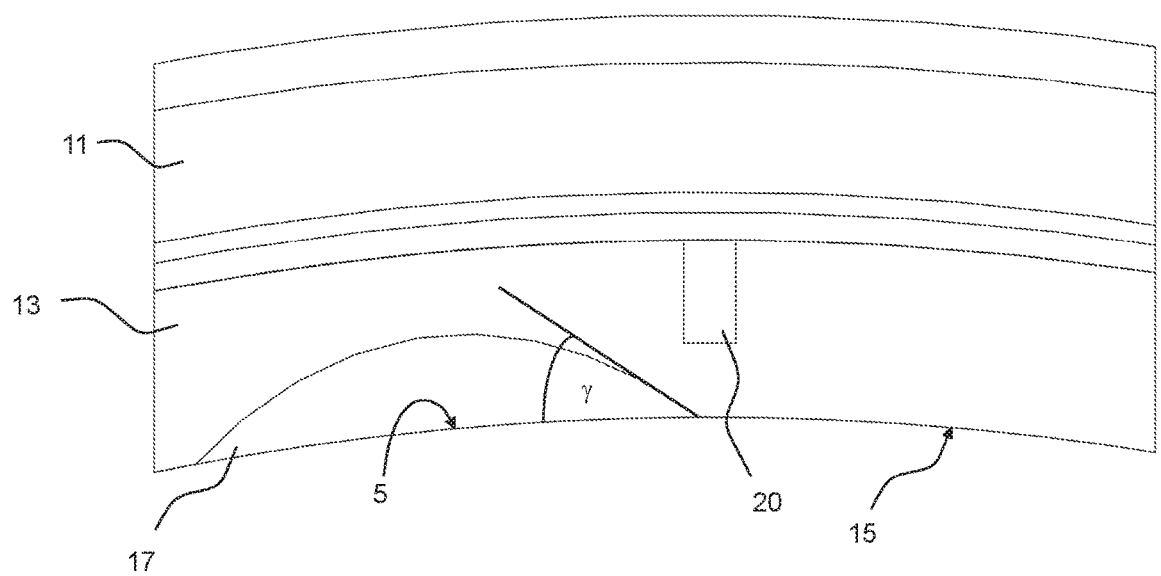
FIG. 5 shows a side view of the seal assembly.

In FIG. 5 a side view of the seal assembly is sectionally depicted.

The edge of the cavities 17, which edge is adjacent to the outer surface 5, forms an angle γ with the seal surface 15 or the outer surface 5 between 10° and 45°. In particular, the edges of the cavities 17 form an angle axially outward on the seal ring between 15° and 30°. The angle is thus significantly smaller than the angle between the side surfaces 21 of the seal ring 13 and of the shaft 3. The lubricant can therefore easily penetrate from the cavities 17 under the seal surface 15.

A further groove 20 is also depicted that does not connect to a cavity 17, but rather is placed independently thereof. An adhering of the seal ring 13 to the side surface of the groove is prevented by the groove 20.

The seal edge 19 is not radially rounded by the cavities 17, but rather sealingly abuts over its entire circumference, or sliding on the lubricating film, on the outer surface 5 of the shaft 3. It is thus possible to achieve a high sealing effect even for the axial movement components and for static application profiles.

In one alternative exemplary embodiment the seal is embodied outwardly sealing; the structure is consequently the other way around radially. An outwardly lying movable part is statically and dynamically sealed by an analogously acting seal assembly.

The present invention can advantageously be used in all types of rotary distributors in all areas of mechanical engineering, among others for installation spaces according to ISO 3320 and ISO 7425. Other use areas are rotary joints of mobile hydraulics, filling systems in the food industry, drilling equipment in oil and gas production, as well as robot technology.

In preferred embodiments the seal- or sliding-ring is comprised of a thermoplastic including a high proportion of solid-lubricant-filled polyurethane elastomer having a hardness of approximately 57 Shore D. The clamping ring, however, is comprised, for example, of nitrile rubber (NBR). The clamping ring advantageously has a rectangular profile cross-section, so that a fixed and secure-against-rotation seat in the housing is possible. It cannot twist in the installation space and is easily manufacturable both by machining and also in a forming tool. For less severe load cases an O-ring can also be used as preload element.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Housing
3 Shaft
5 Outer surface
7 Gap
9 Groove
11 Clamping ring
13 Seal ring
15 Seal surface
17, 17' Cavity
18 Lubricating film
19 Seal edge
20 Groove
21 Side surface
23, 25 Arrow
27 Elevation
U Environment
H High-pressure side
α Angle
β Angle
γ Angle

The invention claimed is:

1. A seal assembly configured to seal a rotatable machine part relative to a fixed machine part, the seal assembly comprising:
   a sliding ring provided on the fixed machine part, the sliding ring having a first side surface, a second side surface, and a seal surface extending from the first side surface to the second side surface, the seal surface being configured to slidingly abut against a counter surface of the movable machine part, and
   a clamping ring configured to exert a force on the sliding ring in a direction of the counter surface,
   wherein the first side surface meets the seal surface at a first junction and the second side surface meets the seal surface at a second junction,
   wherein the sliding ring includes a first plurality of circumferentially spaced recesses each bounded by a first edge in the first side surface and a second edge in the seal surface,
   wherein each of the first edges has a first end at the first junction and a second end at the first junction spaced circumferentially from the first end of the first edge,
   wherein each of the second edges has a first end at the first junction and a second end at the first junction spaced circumferentially from the first end of the second edge,
   wherein each of the first edges is entirely non-linear from the first end of the first edge to the second end of the first edge, and
   wherein each of the second edges is entirely non-linear from the first end of the second edge to the second end of the second edge.

2. The seal assembly according to claim 1,
   wherein each of the first edges is entirely convex from the first end of the first edge to the second end of the first edge, and
   wherein each of the second edges is entirely convex from the first end of the second edge to the second end of the second edge.

3. The seal assembly according to claim 2,
   wherein each of the first plurality of recesses is bowl-shaped.

4. The seal assembly according to claim 3,
   wherein each of the plurality of recesses comprises a quarter sphere or a quarter ellipsoid.

5. The seal assembly according to claim 2,
   including a second plurality of circumferentially spaced recesses each bounded by a third edge in the second axial side surface and a fourth edge in the seal surface,
   wherein each of the third edges has a first end at the second junction and a second end at the second junction spaced circumferentially from the first end of the third edge,
   wherein each of the fourth edges has a first end at the second junction and a second end at the second junction spaced circumferentially from the first end of the fourth edge,
   wherein each of the third edges is entirely non-linear from the first end of the third edge to the second end of the third edge,
   wherein each of the fourth edges is entirely non-linear from the first end of the fourth edge to the second end of the fourth edge, and
   wherein the first plurality of circumferentially spaced recesses are circumferentially offset from the second plurality of circumferentially spaced recesses.

6. The seal assembly according to claim 5,
   wherein the first side surface includes a first portion flared outward from the seal surface at an obtuse angle, and
   wherein the first edge is located in the first portion of the first side surface.

7. The seal assembly according to claim 6,
   wherein the second side surface includes a first portion flared outward from the seal surface at an obtuse angle, and
   wherein the second edge is located in the first portion of the second side surface.

8. The seal assembly according to claim 1, wherein inner surfaces of the recesses merge into the seal surface in the circumferential direction at an angle of 10° to 35°.

9. The seal assembly according to claim 1, wherein inner surfaces of the recesses merge into the seal surface in the axial direction at an angle of 35° to 55°.

* * * * *